(12) United States Patent
Jiang et al.

(10) Patent No.: US 8,527,670 B2
(45) Date of Patent: Sep. 3, 2013

(54) METHOD AND APPARATUS FOR MODIFYING USB DEVICE DRIVER MATCHING INFORMATION

(75) Inventors: Wenchun Jiang, Shenzhen (CN); Guiying Xue, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 13/408,113

(22) Filed: Feb. 29, 2012

(65) Prior Publication Data
US 2012/0159010 A1 Jun. 21, 2012

Related U.S. Application Data

(63) Continuation of application No. PCT/CN2010/079326, filed on Dec. 1, 2010.

(30) Foreign Application Priority Data

Dec. 2, 2009 (CN) .......................... 2009 1 0249779

(51) Int. Cl.
| | | |
|---|---|---|
| G06F 3/00 | (2006.01) | |
| G06F 13/12 | (2006.01) | |
| G06F 13/38 | (2006.01) | |

(52) U.S. Cl.
USPC .................................. 710/16; 710/8; 710/65

(58) Field of Classification Search
None
See application file for complete search history.

(56) References Cited

U.S. PATENT DOCUMENTS

| | | | | |
|---|---|---|---|---|
| 6,804,727 | B1* | 10/2004 | Rademacher | .................... 710/9 |
| 8,281,058 | B1* | 10/2012 | McCorkendale et al. | .... 710/104 |
| 2004/0036911 | A1 | 2/2004 | Saida | |
| 2004/0073912 | A1* | 4/2004 | Meza | ............................. 719/321 |
| 2004/0246909 | A1* | 12/2004 | Ahn | ............................. 370/252 |
| 2007/0239903 | A1* | 10/2007 | Bhardwaj et al. | ................. 710/8 |
| 2012/0023232 | A1 | 1/2012 | Zhang et al. | |

FOREIGN PATENT DOCUMENTS

| | | |
|---|---|---|
| CN | 1472656 A | 2/2004 |
| CN | 101582794 A | 11/2009 |
| CN | 101588268 A | 11/2009 |
| CN | 101702143 A | 5/2010 |
| JP | 10-11385 | 1/1998 |
| JP | 2003-99262 | 4/2003 |
| JP | 2012-523724 | 10/2012 |

OTHER PUBLICATIONS

European Patent Communication; dated (mailed) May 25, 2012; relating to the extended European search report, pursuant to Rule 62 EPC, the supplementary European search report (Art. 153(7) EPC) and the European search opinion in connection with Application No. 10834225.4-2212 for Huawei Device Co., Ltd.

(Continued)

*Primary Examiner* — Kris Rhu
(74) *Attorney, Agent, or Firm* — Staas & Halsey LLP

(57) ABSTRACT

A method for modifying a USB device driver matching string includes: when a plug-and-play manager sends a request for querying device information to a physical device object, capturing, by a filter driver, the request for querying device information, and sending the request to an enumeration driver; receiving, by the filter driver, device information that is returned, according to the request for querying device information, by the enumeration driver, and forming, according to the returned device information and compatibility information of the device, a device driver matching string; and sending the device driver matching string to the plug-and-play manager.

16 Claims, 3 Drawing Sheets

(56) References Cited

OTHER PUBLICATIONS

Microsoft Office 698 Article: "Plug and Play Overview: How Windows Finds Drivers for USB Devices" at URL: http://www.techspot.com/community/topics/plug-and-play-overview-how-windows-finds-drivers-for-usb-devices.127886/, May 20, 2009.

English-Language International Search Report from the Chinese Patent Office in International Application No. PCT/CN2010/079326 mailed Mar. 10, 2011.

Ito, H., *Plug-and-Play and Power Management*, Interface June 200, vol. 26, No. 6, pp. 109-123.

*Plug and Play Overview: How Windows Finds Drivers for USB Devices*, Techspot.com, May 20, 2009 (4 pp.).

How Windows determines the most suitable device drive to install during Setup, Microsoft Support, Dec. 3, 2007, Article ID 279112, Revision 6.3 (7 pp.)

Notice of Reasons for Rejection, dated Apr. 16, 2013, in corresponding Japanese Application No. 2012-541309 (6 pp.).

Japanese Office Action issued Dec. 11, 2012 in corresponding Japanese Patent Application No. 2012-541309.

English Translation of the Written Opinion of the International Searching Authority issued Mar. 10, 2011 in corresponding International Patent Application No. PCT/CN2010/079326.

George Roussos et al., "Plug and Play Key Concept", Microsoft Windows Driver Developer Conference 2008, Oct. 2008, URL http://msdn.microsoft.com/ja-jp/windows/hardware/gg462982.

"Description of USB", Japan, Jun. 2001, 17 pages, URL, http://www.picfun.com/picclub/dai12/usbtech.pdf.

\* cited by examiner

METHOD AND APPARATUS FOR MODIFYING USB DEVICE DRIVER MATCHING INFORMATION

CROSS-REFERENCE TO RELATED APPLICATION

This application is a continuation of International Application No. PCT/CN2010/079326, filed on Dec. 1, 2010, which claims priority to Chinese Patent Application No. 200910249779.X, filed on Dec. 2, 2009, both of which are hereby incorporated by reference in their entireties.

FIELD OF THE INVENTION

The present invention relates to the USB device field, and in particular, to a method and an apparatus for modifying a USB device driver matching information.

BACKGROUND OF THE INVENTION

According to a USB (Universal Serial Bus, universal serial bus) specification, a device driver matching string of a USB device mainly has the following three formats: The first format is formed by a vid (vendor identification, vendor identification), a PID (product identification, product identification), and an MI (Multiple-Interface, Product-Port) number, which is represented in the following form: vid_xxxx&pid_yyyy&mi_zz; the second format is formed by a vid, a subclass (device subclass), and a protocol (device protocol type), which is represented in the following form: vid_xxxx&subclass_yy&prot_zz; the third format is formed by a class (device class), a subclass, and a protocol, which is represented in the following form: class_xx&subclass_yy&prot_zz.

For the first format and the second format, vids may be used to identify different vendors. However, a Windows system does not support the second format and the third format cannot identify each vendor. Therefore, most device driver matching strings of USB devices that are manufactured by each OEM (original equipment manufacturer, original equipment manufacturer) use the device driver matching strings of the first format. In addition, each vendor generally has a suite of drivers applicable to all products of a same kind, and products of the same kind are differentiated by using different PIDs.

To enable a device driver to correctly match a device, a device driver matching string list corresponding to this kind of device needs to be preset in an operating system. When a device requires a driver, it is necessary only to obtain a device driver matching string of the device and search the device driver matching string list for a device driver corresponding to the device driver matching string.

In the process of implementing the matching of the device driver, the inventor finds that the prior art has at least following problems: A defect of the device driver matching string of the first format is that the device driver matching string is limited to the PID of the device; once the PID is changed, a driver matching file needs to be modified, which increases costs in maintenance and certification.

SUMMARY OF THE INVENTION

Embodiments of the present invention provide a method and an apparatus for modifying a USB device driver matching information, so that after a RD or a port number of a device is changed, a driver corresponding to the device can still be determined without modifying a driver matching file, which saves costs in the driver maintenance and certification.

To achieve the foregoing objectives, embodiments of the invention provide the following technical solutions:

A method for modifying a USB device driver matching information includes:

capturing, by a filter driver, a request for querying device information when a plug-and-play manager sends the request for querying device information to a physical device object, and sending the captured request for querying device information to an enumeration driver;

receiving, by the filter driver, device information that is returned, according to the request for querying device information, by the enumeration driver, and forming, according to the returned device information and compatibility information of the device, a device driver matching string that includes a device vendor identification, a device subclass, and a device protocol type; and sending the formed device driver matching string to the plug-and-play manager.

An apparatus for modifying a USB device driver matching information includes:

an information request capturing module, configured to capture a request for querying device information when a plug-and-play manager sends the request for querying device information to a physical device object;

an information request sending module, configured to send the request for querying device information captured by the information request capturing module to an enumeration driver;

an information receiving module, configured to receive device information that is returned, according to the request for querying device information, by the enumeration driver;

a forming module, configured to form, according to the returned device information and compatibility information of the device, a device driver matching string that includes a device vendor identification, a device subclass, and a device protocol type; and a string sending module, configured to send the device driver matching string formed by the forming module to the plug-and-play manager.

In some embodiments of the present disclosure, the filter driver is added on the enumeration driver; when the plug-and-play manager sends the request for querying device information to the physical device object, the filter driver captures the request for querying device information; in addition, after the enumeration driver returns the device information according to the request for querying device information, the device driver matching string that includes the device vendor identification, the device subclass, and the device protocol type is formed according to the returned device information and the compatibility information of the device, and the formed device matching string is sent to the plug-and-play manager. In this way, an operating system may implement matching of a device driver program according to information about the vendor identification, the device subclass, and the device protocol type in the device driver matching string. In some embodiments, for a device vendor, only a device driver matching string of the device driver program needs to be compiled according to the device subclass and the device protocol type to implement matching of a driver program for devices of a same kind; subsequently, no matter how product identifications or product-port numbers of the devices of the same kind are changed, the device driver matching string of the devices of the same kind does not need to be recompiled. In this way, a device driver matching string of products of a same kind or ports of a same kind is developed only once and is reused, which may greatly save the costs in driver maintenance and certification during massive production.

BRIEF DESCRIPTION OF THE DRAWINGS

To make the technical solutions according to the embodiments of the present invention or in the prior art clearer, the accompanying drawings for illustrating the embodiments or the prior art are briefly described below. Apparently, the accompanying drawings in the following description are only some embodiments of the present invention, and persons of ordinary skill in the art may derive other accompanying drawings from these accompanying drawings without creative efforts.

DETAILED DESCRIPTION OF THE EMBODIMENTS

The technical solutions of the present invention are described clearly and completely hereunder with reference to the accompanying drawings. Apparently, the embodiments described below are exemplary only, without covering all embodiments of the present invention. Persons of ordinary skill in the art may derive other embodiments from the embodiments given herein without making any creative effort, and all such embodiments are covered in the protection scope of the present invention.

Embodiment 1

Figure 1:
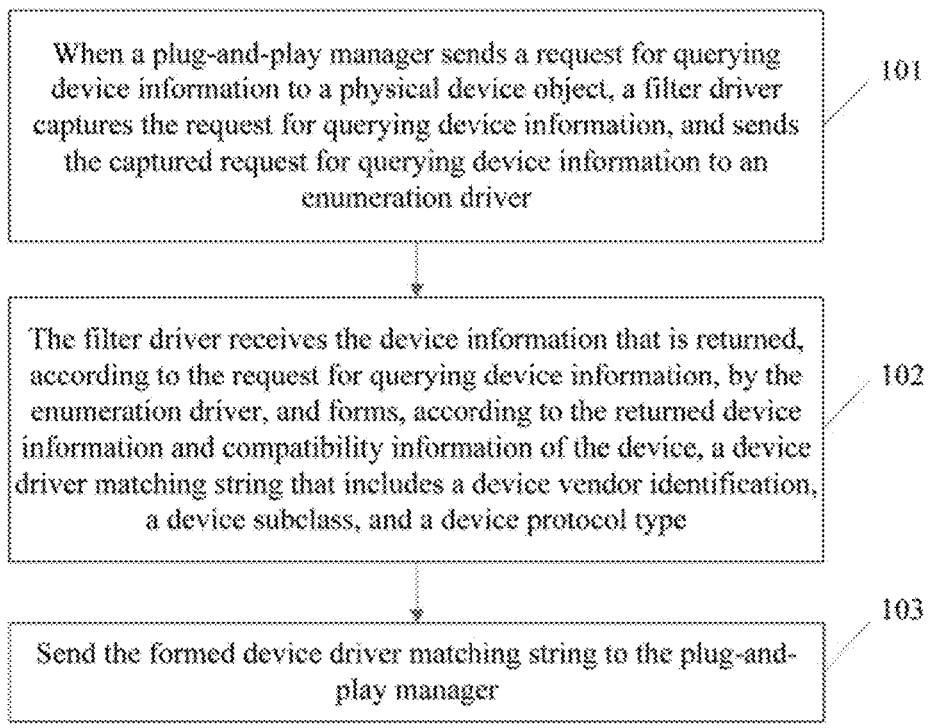
FIG. 1 is a flowchart of a method for modifying a USB device driver matching string according to a first embodiment of the present invention.

The first embodiment of the present invention provides a method for modifying a USB device driver matching string. As shown in FIG. 1, the method includes:

Step 101: When a plug-and-play manager sends a request for querying device information to a physical device object, a filter driver captures the request for querying device information, and sends the captured request for querying device information to an enumeration driver, where the filter driver is a driver program newly added on the enumeration driver.

The captured request for querying device information is sent to the enumeration driver, so that the enumeration driver returns device information according to the query request, where the device information returned by the enumeration driver is in the form of a string, the device information may include a device vendor identification, a product identification, and a product-port number, and the device information may be represented in the following form: vid_xxxx&pid_yyyy&mi_zz.

Step 102: The filter driver receives the device information that is returned, according to the request for querying device information, by the enumeration driver, and forms, according to the returned device information and compatibility information of the device, a device driver matching string that includes a device vendor identification, a device subclass, and a device protocol type, where the device driver matching string may be represented in the following form: vid_xxxx&subclass_yy&prot_zz.

The compatibility information of the device is in the form of a string; the compatibility information may include a device class, a device subclass, and a device protocol type; and the compatibility information may be represented in the following form: class_xx&subclass_yy&prot_zz. Before the filter driver forms, according to the returned device information and the compatibility information of the device, the device driver matching string that includes the device vendor identification, the device subclass, and the device protocol type, the filter driver may obtain the compatibility information of the device by sending a request for querying compatibility information of the device to the physical device object.

Step 103: Send the formed device driver matching string to the plug-and-play manager, so that the plug-and-play manager found, according to the formed device driver matching string, a driver program that matches the physical device.

In this embodiment of the present invention, the filter driver is added on the enumeration driver; when the plug-and-play manager sends the request for querying device information to the physical device object, the filter driver captures the request for querying device information; in addition, after the enumeration driver returns the device information according to the request for querying device information, the device driver matching string that includes the device vendor identification, the device subclass, and the device protocol type is formed according to the returned device information and the compatibility information of the device, and the formed device driver matching string is sent to the plug-and-play manager. In this way, an operating system may implement matching of a device driver program according to information about the vendor identification, the device subclass, and the device protocol type in the device driver matching string. In some embodiments, for a device vendor, only a device driver matching string of the device driver program needs to be compiled according to the device subclass and the device protocol type to implement matching of a driver program for devices of a same kind; subsequently, no matter how product identification or product-port numbers of the devices of the same kind are changed, the device driver matching string of the devices of the same kind does not need to be recompiled. In this way, a device driver matching string of products of a same kind or ports of a same kind is developed only once and is reused, which may greatly save costs in driver maintenance and certification during massive production.

Embodiment 2

Figure 2:
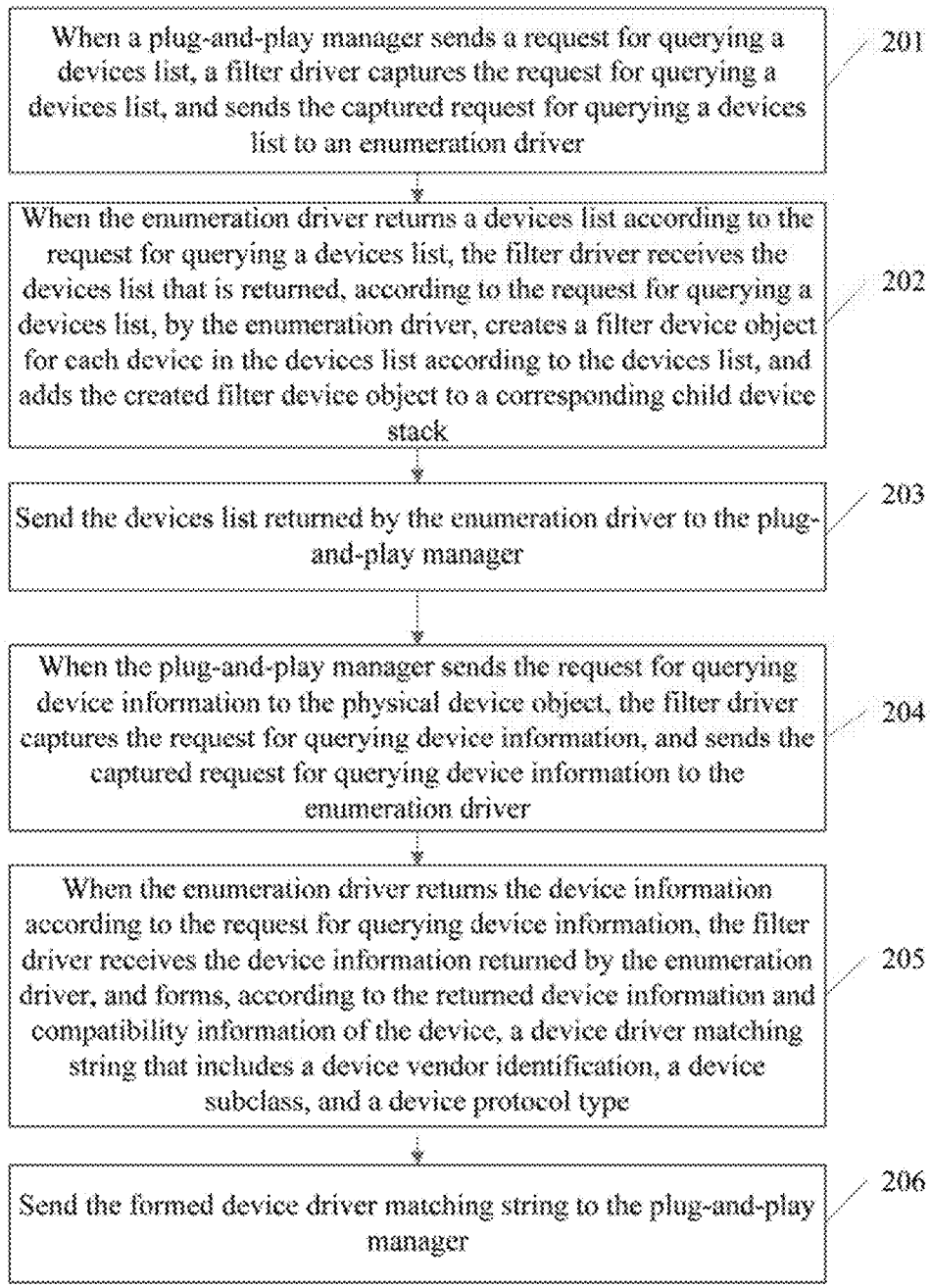
FIG. 2 is a flowchart of a method for modifying a USB device driver matching string according to a second embodiment of the present invention.

The second embodiment of the present invention provides a method for modifying a USB device driver matching string. As shown in FIG. 2, the method includes:

Step 201: When a plug-and-play manager sends a request for querying a device list, a filter driver captures the request for querying a device list, and sends the captured request for querying a device list to an enumeration driver, where the filter driver is a driver program newly added on the enumeration driver.

The captured request for querying a device list is sent to the enumeration driver, so that the enumeration driver enumerates all devices according to the request for querying a device list, and returns a device list of all the enumerated devices to the plug-and-play manager. Further, to enable the filter driver to know that the operation that the enumeration driver enumerates all the devices according to the request for querying a device list has been finished, a completion callback function may be registered for the request for querying a device list after the request for querying a device list is captured.

Step 202: When the enumeration driver returns a device list according to the request for querying a device list, the filter driver receives the device list that is returned, according to the request for querying a device list, by the enumeration driver, creates a filter device object for each device in the device list according to the device list, and adds the created filter device object to a corresponding child device stack.

Further, when the enumeration driver returns the device list according to the request for querying a device list, a system may automatically invoke the completion callback function registered for the request for querying a device list so as to perform the following operations: The filter driver creates a filter device object for each device in the device list according to the device list that is returned by the enumeration driver, and adds the created Filter device object to the corresponding child device stack. In this way, it may be ensured that the newly added filter driver can capture, according to the filter device object in the child device stack, a request for querying device information sent by the plug-and-play manager, and can modify device information returned by the enumeration driver.

Step 203: Send the device list returned by the enumeration driver to the plug-and-play manager, so that the plug-and-play manager sends the request for querying device information to a physical device object in the device list according to the device list.

Step 204: When the plug-and-play manager sends the request for querying device information to the physical device object, the filter driver captures the request for querying device information, and sends the captured request for querying device information to the enumeration driver.

The captured request for querying device information is sent to the enumeration driver, so that the enumeration driver returns the device information according to the query request, where the device information returned by the enumeration driver is in a form of a string, the device information may include a device vendor identification, a product identification, and a product-port number, and the device information may be represented in the following form: vid_xxxx&pid_yyyy&mi_zz. Further, to enable the filter driver to know that the operation that the enumeration driver enumerates the device information according to the request for querying device information has been finished, a completion callback function may be registered for the request for querying device information after the request for querying device information is captured.

Step 205: When the enumeration driver returns the device information according to the request for querying device information, the filter driver receives the device information returned by the enumeration driver, and forms, according to the returned device information and compatibility information of the device, a device driver matching string that includes a device vendor identification, a device subclass, and a device protocol type, where the device driver matching string may be represented in the following form: vid_xxxx&subclass_yy&prot_zz.

Further, when the enumeration driver returns the device information according to the request for querying device information, the system may automatically invoke the completion callback function registered for the request for querying device information so as to perform the following operation: A device driver matching string that includes a device vendor identification, a device subclass, and a device protocol type is formed according to the returned device information and the compatibility information of the device.

The compatibility information of the device is in the form of a string; the compatibility information may include a device class, a device subclass, and a device protocol type; and the compatibility information may be represented in the following form: class_xx&subclass_yy&prot_zz. Before the filter driver forms, according to the returned device information and the compatibility information of the device, the device driver matching string that includes the device vendor identification, the device subclass, and the device protocol type, the filter driver may obtain the compatibility information of the device by sending a request for querying compatibility information of the device to the physical device object.

Step 206: Send the formed device driver matching string to the plug-and-play manager, so that the plug-and-play manager found, according to the formed device driver matching string, a driver program that matches the physical device.

In this embodiment of the present invention, the filter driver is added on the enumeration driver; the added filter driver creates a corresponding filter device object for each device enumerated by the enumeration driver, and adds the created device object to the corresponding child device stack so as to establish a relationship between the filter driver and the device object; when the plug-and-play manager sends the request for querying device information to the physical device object, the added filter driver captures the request for querying device information; in addition, after the enumeration driver returns the device information according to the request for querying device information, the device driver matching string that includes the device vendor identification, the device subclass, and the device protocol type is formed according to the returned device information and the compatibility information of the device, and the formed device driver matching string is sent to the plug-and-play manager. In this way, an operating system may implement matching or a device driver program according to information about the vendor identification, the device subclass, and the device protocol type in the device driver matching string. In this embodiment of the present invention, for a device vendor, only a device driver matching string of the device driver program needs to be compiled according to the device subclass and the device protocol type to implement matching of a driver program for devices of a same kind; subsequently, no matter how product identifications or product-port numbers of the devices of the same kind are changed, the device driver matching string of the devices of the same kind does not need to be recompiled. In this way, a device driver matching string of products of a same kind or ports of a same kind is developed only once and is reused, which may greatly save costs in driver maintenance and certification during massive production.

Embodiment 3

Figure 3:
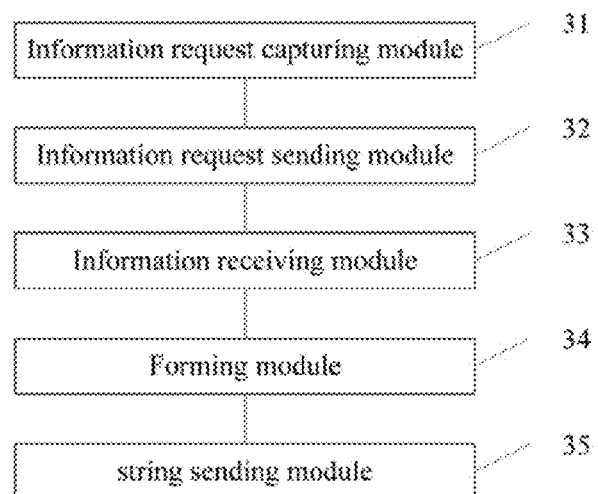
FIG. 3 is a block diagram of an apparatus for modifying a USB device driver matching string according to a third embodiment of the present invention.

This embodiment of the present invention provides an apparatus for modifying a USB device driver matching string. As shown in FIG. 3, the apparatus includes an information request capturing module 31, an information request sending module 32, an information receiving module 33, a forming module 34, and a string sending module 35.

The information request capturing module 31 is configured to capture a request for querying device information when a plug-and-play manager sends the request for querying device information to a physical device object.

After the request for querying device information is captured, the information request sending module 32 is configured to send the request for querying device information captured by the information request capturing module 31 to an enumeration driver, so that the enumeration driver returns device information according to the query request. The device information returned by the enumeration driver is in a form of a string; the device information includes a device vendor identification, a product identification, and a product-port number; and the device information may be represented in the following form: vid_xxxx&pid_yyyy&mi_zz.

When the enumeration driver returns the device information after receiving the request for querying device information, the information receiving module 33 is configured to receive the device information returned by the enumeration driver.

The forming module 34 is configured to form, according to the returned device information and compatibility information of the device, a device driver matching string that includes a device vendor identification, a device subclass, and a device protocol type, where the device driver matching string may be represented in the following form: vid_xxxx&subclass_yy&prot_zz.

The string sending module 35 is configured to send the device driver matching string formed by the forming module 34 to the plug-and-play manager, so that the plug-and-play manager found, according to the formed device driver matching string, a driver program matching the physical device.

The compatibility information of the device is in the form of a string; the compatibility information may include a device class, a device subclass, and a device protocol type; and the compatibility information may be represented in the following form: class_xx&subclass_yy&prot_zz. Before the device driver matching string that includes the device vendor identification, the device subclass, and the device protocol type is formed according to the returned device information and the compatibility information of the device, a request for querying compatibility information of the device is sent to the physical device object to obtain the compatibility information of the device.

In this embodiment of the present invention, when the plug-and-play manager sends the request for querying device information to the physical device object, the request for querying device information is captured: in addition, after the enumeration driver returns the device information according to the request for querying device information, the device driver matching string that includes the device vendor identification, the device subclass, and the device protocol type is formed according to the returned device information and the compatibility information of the device, and the formed device driver matching string is sent to the plug-and-play manager. In this way, an operating system may implement matching of a device driver program according to information about the vendor identification, the device subclass, and the device protocol type in the device driver matching string. In this embodiment of the present invention, for a device vendor, only a device driver matching string of the device driver program needs to be compiled according to the device subclass and the device protocol type to implement matching of a driver program for devices of a same kind; subsequently, no matter how product identifications or product-port numbers of the devices of the same kind are changed, the device driver matching string of the devices of the same kind does not need to be recompiled. In this way, a device driver matching string of products of a same kind or ports of a same kind is developed only once and is reused, which may greatly save costs in driver maintenance and certification during massive production.

Embodiment 4

This embodiment of the present invention provides an apparatus for modifying a USB device driver matching string.

Figure 4:
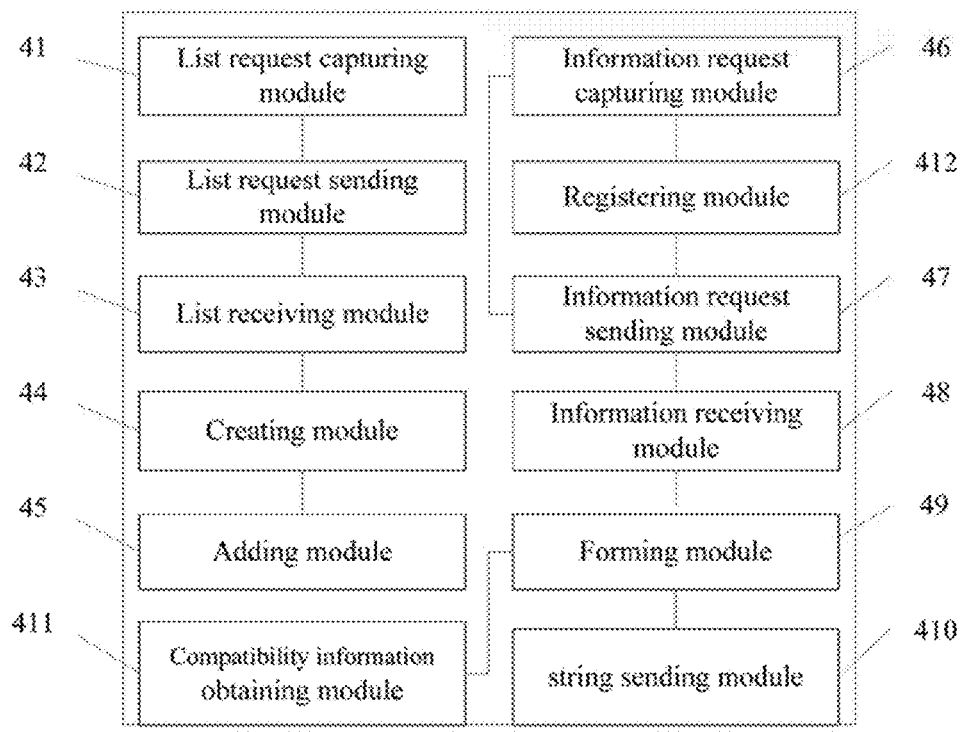
FIG. 4 is a block diagram of an apparatus for modifying a USB device driver matching string according to a fourth embodiment of the present invention.

As shown in FIG. 4, the apparatus includes a list request capturing module 41, a list request sending module 42, a list receiving module 43, a creating module 44, an adding module 45, an information request capturing module 46, an information request sending module 47, an information receiving module 48, a forming module 49, and a string sending module 410.

The list request capturing module 41 is configured to capture a request for querying a device list when a plug-and-play manager sends the request for querying a device list.

The list request sending module 42 is configured to send the request for querying a device list captured by the list request capturing module 41 to an enumeration driver, so that the enumeration driver enumerates all devices according to the request for querying a device list and returns a list of all the enumerated devices to the plug-and-play manager. To enable the filter driver to know that the operation that the enumeration driver enumerates all the devices according to the request for querying a device list has been finished, a completion callback function is generally registered for the request for querying a device list after the request for querying a device list is captured.

When the enumeration driver returns a device list according to the request for querying a device list, the list receiving module 43 is configured to receive the device list that is returned, according to the request for querying a device list, by the enumeration driver.

The creating module 44 is configured to create a filter device object for each device in the device list according to the device list received by the list receiving module 43.

The adding module 45 is configured to: add the filter device object created by the creating module 44 to a corresponding child device stack; and after adding the filter device object to the corresponding child device stack, send the device list returned by the enumeration driver to the plug-and-play manager, so that the plug-and-play manager sends a request for querying device information to a physical device object in the list according to the device list. When the enumeration driver returns the device list according to the request for querying a device list, a system may automatically invoke the completion callback function registered for the request for querying a device list so as to create a filter device object for each device in the device list according to the returned device list, and add the created filter device object to the corresponding child device stack. In this way, it may be ensured that the request for querying device information sent by the plug-and-play manager can be captured according to the filter device object in the child device stack, and device information returned by the enumeration driver can be modified.

The information request capturing module 46 is configured to capture the request for querying device information when the plug-and-play manager sends the request for querying device information to a physical device object.

After the information request is captured, the information request sending module 47 is configured to send the request for querying device information captured by the information request capturing module 46 to the enumeration driver, so that the enumeration driver returns the device information according to the query request, where the device information returned by the enumeration driver is in a form of a string, the device information includes a device vendor identification, a product identification, and a product-port number, and the device information may be represented in the following form: vid_xxxx&pid_yyyy&mi_zz.

When the enumeration driver returns according to the request for querying device information, the information receiving module 48 is configured to receive the device information returned by the enumeration driver.

After the device information is received, the forming module 49 is configured to form, according to the returned device information and compatibility information of the device, a device driver matching string that includes a device vendor identification, a device subclass, and a device protocol type, where the device driver matching string may be represented in the following form: vid_xxxx&subclass_yy&prot_zz.

The string sending module 410 is configured to send the device driver matching string formed by the forming module 49 to the plug-and-play manager, so that the plug-and-play manager found, according to the formed device driver matching string, a driver program matching the physical device. The compatibility information of the device is in the form of a string; the compatibility information includes a device class, a device subclass, and a device protocol type; and the compatibility information may be represented in the following form: class_xx&subclass_yy&prot_zz.

Before a new device driver matching string is formed by the device information returned by the enumeration driver and the compatibility information of the device, the apparatus for modifying a USB device driver matching string may further include a compatibility information obtaining module 411. The compatibility information obtaining module 411 is configured to send a request for querying compatibility information of the device to the physical device object to obtain the compatibility information of the device.

Further, to enable the filter driver to know that the operation that the enumeration driver enumerates the device information according to the request for querying device information has been finished, the apparatus for modifying a USB device driver matching string may further include a registering module 412. The registering module 412 is configured to register a completion callback function for the request for querying device information before the information request capturing module 46 sends the captured request for querying device information to the enumeration driver, so that when the enumeration driver returns the device information according to the request for querying device information, the system automatically invokes the registered completion callback function to form, according to the returned device information and the compatibility information of the device, a device driver matching string that includes a device vendor identification, a device subclass, and a device protocol type.

In this embodiment of the present invention, the filter driver creates a corresponding filter device object for each device enumerated by an enumeration driver, and adds the created device object to the corresponding child device stack so as to establish a relationship between the filter driver and the device object; when the plug-and-play manager sends the request for querying device information to a physical device object, the filter driver captures the request for querying device information; in addition, after the enumeration driver returns the device information according to the request for querying device information, the device driver matching string that includes the device vendor identification, the device subclass, and the device protocol type is formed according to the returned device information and the compatibility information of the device, and the formed device driver matching string is sent to the plug-and-play manager. In this way, an operating system may implement matching of a device driver program according to information about the vendor identification, the device subclass, and the device protocol type in the device driver matching string. In this embodiment of the present invention, for a device vendor, only a device driver matching string of the device driver program needs to be compiled according to the subclass and protocol to implement matching of a driver program for devices of a same kind; subsequently, no matter how product identifications or product-port numbers of the devices of the same kind is changed, the device driver matching string of the devices of the same kind does not need to be recompiled. In this way, a device driver matching string of products of a same kind or ports of a same kind is developed only once and is reused, which may greatly save costs in driver maintenance and certification during massive production.

Embodiments of the present invention describe only a special case that a filter driver is used to modify a device driver matching string. However, through this technical solution, all information that the enumeration driver returns to the plug-and-play manager may be modified, which also falls within the protection scope of the present invention.

Based on the preceding description about implementation manners, it may be understandable to those skilled in the art that the present invention may be implemented by software in addition to a necessary universal hardware platform or by hardware only. In most circumstances, the former is a better implementation manner. Based on such understanding, the technical solutions of the present invention or the portions contributing to the prior art may be embodied by a software product. The software product is stored in a readable storage medium, for example, a floppy disk, a hard disk, or a Compact Disc-Read Only Memory (CD-ROM) of a computer, and incorporate several instructions to instruct a computer device (for example, a personal computer, a server, or a network device) to execute the method in each of the embodiments of the present invention.

The preceding descriptions are merely exemplary embodiments of the present invention, but not intended to limit the protection scope of the present invention. Any modification or replacement readily conceivable by those skilled in the art in the scope of the technology disclosed herein shall fall within the protection scope of the present invention. Therefore, the scope of the present invention is subject to the appended claims.

What is claimed is:

1. A method for modifying a USB device driver matching string, comprising:

capturing, by a filter driver, a request for querying device information, when a plug-and-play manager sends the request for querying device information to a physical device object, and sending the captured request for querying device information to an enumeration driver;

receiving, by the filter driver, device information that is returned, according to the request for querying device information, by the enumeration driver, and forming, according to the returned device information and compatibility information of the device, a device driver matching string that comprises a device vendor identification, a device subclass, and a device protocol type; and sending the formed device driver matching string to the plug-and-play manager.

2. The method according to claim 1, wherein before the filter driver forms, according to the returned device information and compatibility information of the device, a device driver matching string that comprises a device vendor identification, a device subclass, and a device protocol type, the method further comprises:

sending, by the filter driver, a request for querying compatibility information of the device to the physical device object to obtain the compatibility information of the device, wherein the compatibility information of the device comprises a device class, a device subclass, and a device protocol type.

3. The method according to claim 2, wherein the device information is in a form of a string and the device information comprises a device vendor identification, a product identification, and a product-port number.

4. The method according to claim 1, wherein before sending the captured request for querying device information to the enumeration driver, the method further comprises:
registering a completion callback function for the captured request for querying device information, so that when the enumeration driver returns the device information according to the request for querying device information, the registered completion callback function is invoked to perform an operation of forming the device driver matching string according to the device information and the compatibility information.

5. The method according to claim 4, wherein the device information is in a form of a string and the device information comprises a device vendor identification, a product identification, and a product-port number.

6. The method according to claim 1, wherein before the filter driver captures the request for querying device information, the method further comprises:
capturing, by the filter driver, a request for querying a device list, when the plug-and-play manager sends the request for querying a device list, and sending the captured request for querying a device list to the enumeration driver; and
receiving, by the filter driver, a device list that is returned, according to the request for querying a device list, by the enumeration driver, creating a filter device object for each device in the device list according to the device list, and adding the created filter device object to a corresponding child device stack, so that the filter driver captures, according to the filter device object in the child device stack, the request for querying device information.

7. The method according to claim 6, wherein the device information is in a form of a string and the device information comprises a device vendor identification, a product identification, and a product-port number.

8. The method according to claim 1, wherein the device information is in a form of a string and the device information comprises a device vendor identification, a product identification, and a product-port number.

9. An apparatus for modifying a USB device driver matching string, comprising:
an information request capturing module, configured to capture a request for querying device information when a plug-and-play manager sends the request for querying device information to a physical device object;
an information request sending module, configured to send the request for querying device information captured by the information request capturing module to an enumeration driver;
an information receiving module, configured to receive device information that is returned, according to the request for querying device information, by the enumeration driver;
a forming module, configured to form, according to the returned device information and compatibility information of the device, a device driver matching string that comprises a device vendor identification, a device subclass, and a device protocol type; and
a string sending module, configured to send the device driver matching string formed by the forming module to the plug-and-play manager.

10. The apparatus according to claim 9, further comprising:
a compatibility information obtaining module, configured to: before the device driver matching string that comprises the device vendor identification, the device subclass, and the device protocol type is formed according to the returned device information and the compatibility information of the device, send a request for querying the compatibility information of the device to the physical device object to obtain the compatibility information of the device, wherein the compatibility information comprises a device class, a device subclass, and a device protocol type.

11. The apparatus according to claims 10, wherein the device information is in a form of a string and the device information comprises a device vendor identification, a product identification, and a product-port number.

12. The apparatus according to claim 9, further comprising:
a registering module, configured to: before the information request sending module sends the captured request for querying device information to the enumeration driver, register a completion callback function for the request for querying device information, so that when the enumeration driver returns the device information according to the request for querying device information, the registered completion callback function is invoked to perform an operation of forming the device driver matching string according to the device information and the compatibility information.

13. The apparatus according to claims 12, wherein the device information is in a form of a string and the device information comprises a device vendor identification, a product identification, and a product-port number.

14. The apparatus according to claim 9, further comprising:
a list request capturing module, configured to capture a request for querying a device list, when the plug-and-play manager sends the request for querying the device list before the request for querying device information is captured;
a list request sending module, configured to send the request for querying a device list captured by the list request capturing module to the enumeration driver;
a list receiving module, configured to receive a device list that is returned, according to the request for querying a device list, by the enumeration driver;
a creating module, configured to create a filter device object for each device in the device list according to the device list received by the list receiving module; and
an adding module, configured to add the filter device object created by the creating module to a corresponding child device stack so as to capture the request for querying device information according to the filter device object in the child device stack.

15. The apparatus according to claims 14, wherein the device information is in a form of a string and the device information comprises a device vendor identification, a product identification, and a product-port number.

16. The apparatus according to claims 9, wherein the device information is in a form of a string and the device information comprises a device vendor identification, a product identification, and a product-port number.

* * * * *

UNITED STATES PATENT AND TRADEMARK OFFICE
CERTIFICATE OF CORRECTION

PATENT NO. : 8,527,670 B2  
APPLICATION NO. : 13/408113  
DATED : September 3, 2013  
INVENTOR(S) : Jiang et al.

Page 1 of 1

It is certified that error appears in the above-identified patent and that said Letters Patent is hereby corrected as shown below:

In the Claims

Column 12, Line 14, in Claim 11, delete "claims" and insert -- claim --, therefor.
Column 12, Line 31, in Claim 13, delete "claims" and insert -- claim --, therefor.
Column 12, Line 56, in Claim 15, delete "claims" and insert -- claim --, therefor.
Column 12, Line 60, in Claim 16, delete "claims" and insert -- claim --, therefor.

Signed and Sealed this
Twenty-second Day of July, 2014

Michelle K. Lee
*Deputy Director of the United States Patent and Trademark Office*